(12) United States Patent
Hall

(10) Patent No.: US 8,601,522 B2
(45) Date of Patent: Dec. 3, 2013

(54) VIDEO TRANSMISSION SYSTEMS

(75) Inventor: Julian Hall, Cambridge (GB)

(73) Assignee: Veebeam Limited, Cambridge (GB)

(*) Notice: Subject to any disclaimer, the term of this patent is extended or adjusted under 35 U.S.C. 154(b) by 0 days.

(21) Appl. No.: 13/356,106

(22) Filed: Jan. 23, 2012

(65) Prior Publication Data

US 2012/0192243 A1    Jul. 26, 2012

(30) Foreign Application Priority Data

Jan. 24, 2011    (GB) .................... 1101161.6

(51) Int. Cl.
*H04N 7/01* (2006.01)
*H04N 7/173* (2011.01)

(52) U.S. Cl.
USPC ............ 725/93; 725/116; 725/146; 348/458; 348/459

(58) Field of Classification Search
USPC .......................................... 725/93, 116, 146
See application file for complete search history.

(56) References Cited

U.S. PATENT DOCUMENTS

| | | | |
|---|---|---|---|
| 6,870,573 B2* | 3/2005 | Yeo et al. | 348/569 |
| 2008/0211965 A1* | 9/2008 | Lippman | 348/558 |
| 2011/0064384 A1* | 3/2011 | Otani | 386/248 |
| 2011/0126255 A1* | 5/2011 | Perlman et al. | 725/116 |

* cited by examiner

*Primary Examiner* — Nasser Goodarzi
*Assistant Examiner* — Fred Peng
(74) *Attorney, Agent, or Firm* — Loginov & Associates, PLLC; Keri E. Sicard; William A. Loginov

(57) ABSTRACT

This invention relates to video transmission systems, in particular to those used to transmit video content generated and displayed on a source device to a second remote display. We describe a method of transmitting a video stream over a data link is described. Video frames are captured at a capture frame rate. The captured frames are then processed to identify duplicated frames in consecutively captured frames. Duplicated frames, duplicated as a result of capture the same source frame twice, are deleted leaving a filtered set of video frames. The remaining frames are retimed to amend a presentation time and transmitted over a data link to a rendering device.

20 Claims, 8 Drawing Sheets

VIDEO TRANSMISSION SYSTEMS

FIELD OF THE INVENTION

This invention relates to video transmission systems, in particular to those used to transmit video content generated and displayed on a source device to a second remote display.

BACKGROUND TO THE INVENTION

A huge amount of video content is now viewed on home computers and there is an increasing desire to view content downloaded, streamed and stored on home computers on televisions throughout a user's property. Typically this has involved connecting the computer directly to the television via a video output such as VGA, composite or HDMI.

The advent of wireless network technology has allowed video streaming to be provided without a hard-wired connection to the computer. More recently transmission standards such as Wireless USB have enabled provided high performance transmission of bandwidth heavy content, such as high definition video footage to be streamed wirelessly between devices. A USB dongle is connected to the computer to transmit the video data, and a receiver, such as a network streaming device wirelessly receives the content. Such network streaming devices, connected to a television or more recently integrated into a television have therefore allowed content stored on a home computer to be made available for display on a television.

One standard for enabling interactivity between devices has been provided by the Digital Living Network Alliance (DNLA) to allow electronic devices to send and receive multimedia content. The DLNA standard defines a subset of the UPnP standard for interoperability between home entertainment devices. The network streaming device reads the video file from the computer and renders the video from the file for viewing on the connected television. Such access could be over Wireless USB for example.

However, video transmission issues exist, in particular for screencasting. Screencasting is a process whereby all, or a portion of a computer desktop display is replicated to another display such as a television. Preferably audio is also captured and multiplexed with the video. In this arrangement, there is no file or item of video content for the network streaming device to access and thus alternative solutions are required.

One approach for screencasting is to read memory dedicated to a graphics card to capture bitmaps of the displayed data. There are however many challenges faced with this approach, including capturing uncompressed video data, retransmitting such data, minimising delay between the computer and television displays and coping with source content at different frame rates. Coping with high volumes of video data, in particular with high definition video content, puts high demands on the computer and so techniques that can minimise the overhead for video transmission are desired. Particular problems are faced with video capture for screencasting as a result of differences between the source video frame rate and capture frame rate. These differences can result in video judder owing to the mismatched frame rates.

Techniques that can maintain video quality in terms of resolution and frame rate are accordingly needed to ensure that the consumer's can experience high quality video footage of source content streaming from their computer.

SUMMARY OF THE INVENTION

According to a first aspect of the invention there is provided a method of transmitting a video stream over a data link, the video stream comprising a series of video frames having a source frame rate, the method comprising: capturing the series of video frames at a capture frame rate; processing the captured series of video frames to provide a filtered series of video frames, wherein the processing comprises: identifying duplicated frames in consecutive frames of the captured series of video frames, deleting the duplicated frames from the captured series of video frames, and retiming the filtered series of video frames to amend a presentation time for one or more of the filtered series of video frames; and transmitting the retimed filtered series of video frames over the data link.

This method, which we refer to as screencasting, may require some of the capture video frames to be deleted due to capturing the same source frame twice. In embodiments audio may also be transmitted over the datalink. When the captured frames are played back on a device receiving the video stream data via the data link, this leads to errors in the presentation time as the video stream is played back at the capture frame rate rather than the source frame rate—the result is what appears to be 'judder' on video stream playback which may be particularly noticeable on a panning shot. Users typically perceive smooth rendering to be more important than image resolution and so addressing such problems with juddering is important.

It is desirable to ensure that such a method works well on a wide range of PCs with different CPU and graphics performance and so methods of minimise resource overhead are important. In addition to addressing judder, the advent of high resolution images and videos, operating at resolutions such as 720 p, 1080 i and 1080 p, means that image quality is also becoming more and more important to users and so methods of allowing such high definition footage to be processed on a wide performance range of PCs following capture is also important.

The method herein described also allows the user to play content using any suitable player application. The method does not depend on the use of any particular player and so any video source or format may be used on the PC.

The method may further comprise determining a beat frequency. The beat frequency defines a fundamental frequency of the duplicated frames in the captured series of video frames. With source and capture rates stabilised, this beat frequency may be consistent throughout frames, and may be determined from a difference between the capture frame rate and the source frame rate. This enables identification of source frames that are captured twice (or more) by consecutive frame captures from video memory. However, the source frame rate is not directly obtainable and so needs to be indirectly derived by determining the beat frequency. Preferably the deleting of captured video frames is then responsive to detecting the identified duplicated frames occurring at the beat frequency. These frames may then be deleted.

To determine the beat frequency (the fundamental frequency), the method may further comprise generating matching data to indicate whether each of the captured series of video frames has been identified as a duplicated frame or not. This matching data may then be auto-correlated enabling the fundamental frequency of the identified duplicated frames to be determined.

Autocorrelation enables the fundamental frequency to be determined but further analysis may be needed to determine the location of the duplicated frames within the series of captured video frames. The method may therefore further comprise determining a beat cycle position of each of the identified duplicated frames. The beat cycle position defines a frame offset of each of the identified duplicated frames relative to a reference position within the same beat cycle as the particular identified duplicated frame (the beat cycle defines a series of capture frames between two successive identified duplicated frames occurring at the beat frequency). Dependent on the position of the identified duplicated frame within the beat cycle, the flame may be deleted which assists in ensuring any false positives in the duplication detection are not unexpectedly deleted (for example owing to a series of frames where there is no change).

The reference position may be determined by a timing of a correlation peak of a correlation between a tracking mask having a bit pattern period dependent on the beat frequency and the matching data. The bit pattern dependent on the beat frequency provides a tracking mask with a bit pattern identifying frames only occurring at the beat frequency. The timing of correlation peaks then enables the position of the particular frames occurring at the beat frequency to be derived and thus also allows other frames, not occurring at the expected times, to not be marked for deletion. The reference position may also be defined in terms of frames, for example the reference frame may be one of the successively identified duplicated frames which were detected occurring at the beat frequency and the timing/offset may be measured relative to this frame. Thus determining the beat cycle position of each of the identified duplicated frames may comprise cross correlating the matching data with data at the beat frequency.

The captured series of video frames may each comprise a presentation timestamp defining a presentation time for each of the video frames. These presentation timestamps provide information including a time of display at the source frame rate. Consequently, the retiming may comprise modifying the presentation timestamps of one or more of the filtered series of video frames (because some frames may have been deleted) to amend the presentation time of the remaining frames before presentation on the receiving device, such as a television display. This enables the juddering to be removed allowing a smoother scrolling video to be rendered.

The source rate may be determined from a frame count difference between the capture frame rate and the beat frequency by the method steps described above. Accordingly when retiming, this may comprise modifying the presentation timestamps such that the filtered series of video frames has a frame rate substantially equivalent to the source frame rate so that the rendered video appears substantially equivalent to the user.

To identify duplicated frames in consecutive frames, corresponding portions of consecutive frames may be compared to determine if the corresponding portions match one another. This may be by comparing one large region of the video frame or alternatively may comprise dividing each portion into smaller regions such that the entire video flames are not compared and only smaller regions, or segments of the display, are compared. Comparing only selected portions of the video frames is less computationally expensive, allowing the comparison to be implemented on a broader performance range of computers. The regions may be dispersed over the video frame in order to detect movement in many different positions within the video frame, which may improve the probability of detecting a change in the image in each video frame. This may lead to a reduction in the number of frames incorrectly marked as a duplicate (false positives).

It will be appreciated however that by not comparing the entire video frames, determination of a match is imperfect and so false positives may result. The invention herein described shows how calculating a fundamental beat frequency and offsets of the duplicated frames may be used to determine any such false positives so that only source frames captured repeatedly (thus resulting an incorrect presentation time of the capture frames) are deleted.

The video frames may be captured as bitmap data for example. Having such bitmap data may allow the identifying to be implemented by performing a checksum over the portions of bitmap data selected for comparison. If the portions match one another by having the same checksums, then the presence of a duplicated frame can be flagged (by tagging the frame for example).

The video frames may be captured from video memory on the host computer, which may be dedicated memory within a graphics card or alternatively could be shared memory, a portion of which is allocated to the display. The video memory storing the images for displaying on the host computer may operate at a video refresh rate, such as 60 Hz for example. Preferably the capturing is synchronised to this video refresh rate in order to avoid tearing of images (whereby part of one frame and part of a subsequent frame are read from video memory owing to a change of data in video memory during a capture cycle). Synchronising may be 1:1 synchronisation, or more preferably may be an integer division of the video refresh rate, such as a half, or a third, or a quarter to reduce to overhead of capture.

To ensure that all the source frames are captured, in preferred embodiments the capture rate is at least, or greater than the source frame rate. Typically this may comprise a capture rate of 30 frames per second to allow for source frame rates of up to 30 frames per second to be capture without any loss of source frames.

The data link may comprise an IP data link, such as a TCP/IP or UDP/IP link. This link may also be wireless, with the data transmitted wirelessly over the wireless link. The wireless link may adopt one of many different wireless standards, such as wireless USB for example. In such an arrangement the host computer may have a wireless USB dongle, and the receiving device may be a wireless USB receiver integrated (or separate and connected to) a set-top box/renderer attached to a television.

According to a second aspect of the invention there is provided a video transmission system comprising a host computer coupled to a data link, wherein the host computer comprises a graphics subsystem configured to generate video frames having a source frame rate, and wherein the host computer is configured to: capturing the series of video frames at a capture frame rate; process the captured series of video frames to provide a filtered series of video frames, wherein the processing comprises: identifying duplicated frames in consecutive frames in the captured series of video frames, deleting the duplicated frames from the captured series of video frames, and retiming the filtered series of video frames; and after processing the host computer is configured to transmit the retimed filtered series of video frames over the data link.

The invention, still further provides processor control code to implement the method according to the first embodiment of the invention, in particular on a data carrier such as a disk, CD- or DVD-ROM, programmed memory such as read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

BRIEF DESCRIPTION OF THE DRAWINGS

Embodiments of the present invention will now be described by way of example only, with reference to the accompanying figures, in which.

DETAILED DESCRIPTION OF THE PREFERRED EMBODIMENTS

Figure 1:
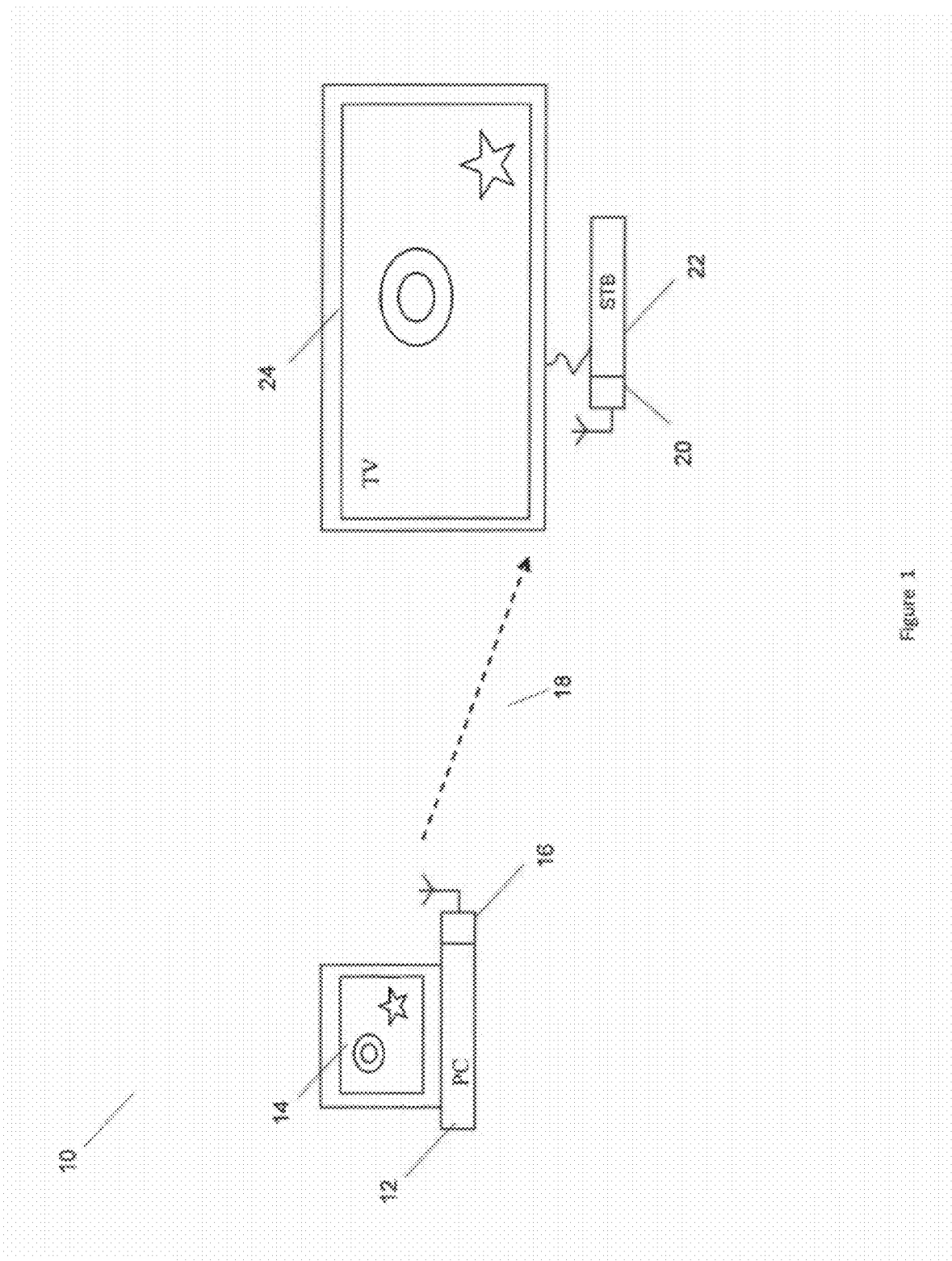
FIG. 1 shows wireless transmission of video from a computer to a television.

FIG. 1 shows an example of screencasting. Image 14 on computer 12 is replicated on television display 24. A set-top box, or renderer 22 connects to the users television 24. The renderer 22 receives the video and audio streams and decodes them to either an HDMI or composite video signal appropriate for the connected television. In FIG. 1, the renderer is based on an IP TV set-top box chip and runs Linux. The renderer connects to the PC 12 via wireless transceiver 20 across a wireless IP network that runs over Wireless USB.

A wireless USB dangle 16 plugs into the PC's USB socket to provide a Wireless USB connection to the renderer. The Wireless USB connection supports data throughput rates in excess of 100 Mb/s. This capacity allows high definition content, such as content running at 720p, 1080i or 1080p to be supported while maintaining a high quality of service.

Running on the PC is a custom application providing a media server, network remote control and graphical user interface. Such an application may be run on a computer running the Microsoft Windows operation system, an Apple Macintosh operating system or a Unix based operating system although the invention is not limited to such operating systems and they are provided as examples only. Other examples include Linux (Trade Mark) and Android (Trade Mark).

In one configuration of the system the custom application can access files directly on the computer and transmit the content to the remote renderer 22. To allow for compatibility with the majority of downloaded content without degradation in quality, the application interfaces with the wide availability of third party codec and container de-multiplexors to transcode any aspects of content that are incompatible with pre-installed codecs on the remote render to a format that is compatible.

In a second configuration of the system, the screencast configuration, content on the computer display is screencast to the TV. This content includes text, graphics and also video, which may be running full screen on the computer or in a window on the display. No access to data files is now possible because multiple different content elements are provided on the display. These may include web pages, streamed video and operating system elements such as the operating system desktop and mouse.

The user is not limited to any particular media player application as the screencasting system described herein is media player agnostic.

Figure 2:
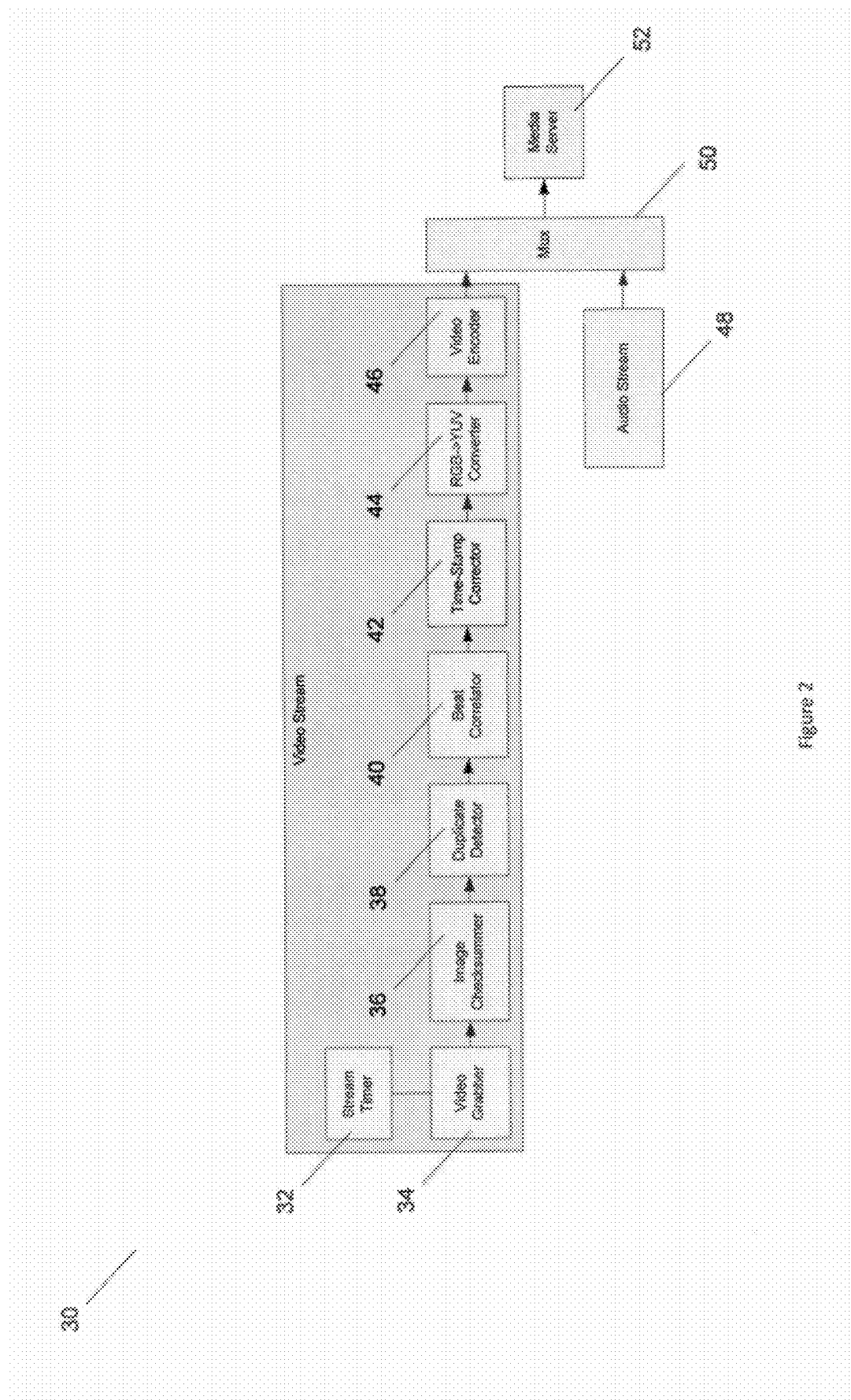
FIG. 2 shows the processing stages involved in produce a screencast video stream.

FIG. 2 shows an example implementation of the screencast system.

Stream timer 32 provides a time base for generation of presentation timestamps. This is used to determine the capture time of the captured frames.

Video grabber 34 is used to capture video frames of the current desktop bitmap into a private buffer. A time stamp is also applied to each capture video frame.

The captured video frames are then processed, firstly passing them through image checksummer 36 which determines if consecutive frames are duplicated. The image on the display may be static and so the next captured image may be the same as the preceding captured image. Alternatively, the image on the display may be changing and owing to differences between the source frame rate and capture frame rate, the same source frame may be captured twice before the video memory has been refreshed with the next image to display.

The duplicate detector 38 then marks, or tags, a frame duplicating the preceding captured video frame.

The beat correlator 40 is responsible for identifying which frames should be discarded and also determines if any timing correction should be applied to the remaining frames. Any incorrectly duplicated frames are then discarded leaving a filtered series of video frames The time-stamp corrector 42 uses the output values provided by the beat correlator to correct the presentation time-stamps for the non-discarded / filtered frames to match the source frame rate.

The RGB-YUV converter 44 converts the filtered series of video frame between the RGB and YUV colour spaces.

The video encoder 46 encodes the filtered series of video frames into a video format understood by the media server and renderer.

The video stream and audio stream are then routed to the media server application for transmission via the wireless USB link to the rendered.

Video Capture

A video player application will play video content at its native frame rate. The most common frame rates are 23.976, 24.0, 25.0 and 30.0 frames per second although other frame rates may also be used.

The screencast stream source uses an O/S service to copy the current desktop bitmap into a private buffer. The O/S specific services used are:

Windows
  BitBlt ( )—capture with no rescaling
  StretchBlt ( )—capture with rescaling
Mac OS/X
  OpenGL—custom capture and scaling using GPU hardware The video capture operation results in a copy from video memory to system memory of the current desktop bitmap. The speed of this operation depends on:

Screen resolution
Level of hardware assistance
Bus bandwidth for reads from video memory Measured capture times may vary widely on Windows PCs vary widely, ranging from 2 ms to 20 ms. The longer capture times seen on some slower PCs effectively limit the possible capture rate. In particular, capturing at 60 fps (16.67 ms period) is not possible on slower PCs and thus limits the capture rate possible.

The BitBlt( ) operation does not provide any synchronisation with other applications that may be writing to the same device context being read. Without synchronisation, there is the risk that the BitBlt( ) operation will return a torn image, consisting of part of two consecutive video frames. This problem is seen when screencasting while playing video using Windows Media Player for example. To solve this problem, a DirectX service may be used to allow capture synchronised to the video memory refresh rate. Synchronise capture is therefore preferable. To synchronise capture, the capture rate used is an integer divisor of the local video refresh frequency. For example, with a video memory reference cycle of 60 Hz, the following capture rates may be used:

60 Hz/2=30 Hz capture rate
60 Hz/3=20 Hz capture rate
60 Hz/4=15 Hz capture rate However, given the common frame rates referred to above, it is preferable to keep the capture rate to no less than 30 Hz. It is also preferable for the capturing process to run at a relatively high priority in order to reduce capture jitter.

The capture operations on the Mac OS/X version can be synchronised to the Core Video frame rate via a callback. The callback is called at the local display refresh rate (typically 60 Hz).

Figure 3:
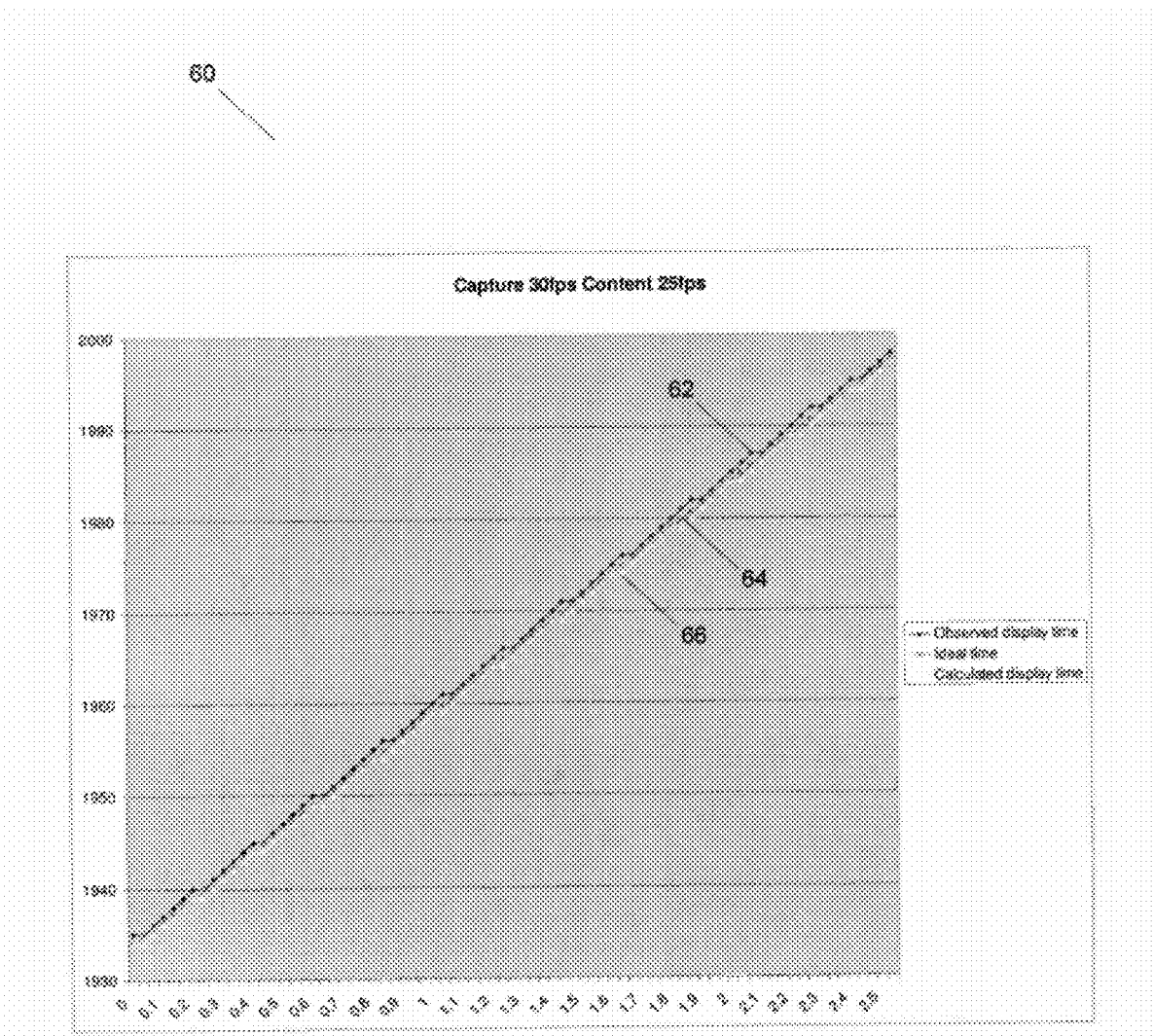
FIG. 3 shows content frame rates and judder.

For judder-free rendering during panning scenes, it is desirable for video frames to be presented at or close to the source frame rate. FIG. 3 illustrates the timing error that occurs if video frames are captured and rendered at a rate different from the content's frame rate (the x-axis shows the time and the y-axis the frame number). In this example, the content frame rate is 25.0 fps and frames are captured and time-stamped at 30 fps (shown by the upper plot line 62). The renderer presents the 30 fps video stream (the lower plot line 66). The resulting effect is that on watching a smooth panning scene with this capture scheme, juddering is obvious to the viewer. To achieve smooth video, the presentation times for the rendered frames should be equally spaced as shown by the middle plot line 64.

As shown in FIG. 3, it can seen that when capturing at a rate higher than the source frame rate, it is inevitable that the same video image will sometimes be caught in consecutive capture cycles. Where both source frame rate and capture rate are stable, the pattern of duplicates will occur at a beat frequency between the two rates:

Beat frequency $f_{duplicate} = f_{capture} - f_{source}$ i.e. the beat frequency is the difference between the capture frequency (capture frame rate) and source frequency (source frame rate).

As the beat frequency is not directly measurable (because the source frame rate cannot be directly determined), it can be indirectly determined from the series of fundamental frequency of duplicated frames within the captured frames. Note that other duplicates may still occur between these duplicated frames that are occurring at this fundamental frequency. By deleting duplicated frames occurring at the beat frequency, the remaining frames occur at the same frame rate as the source frame rate (assuming the capture frame rate is greater than the source capture frame rate).

For a capture rate of 30 fps, duplicate (1) and non-duplicate (0) captures will occur with the following duplicate series:

TABLE 1

Duplicate series for difference source frame rates

| Source Frame Rate | Duplicate Series |
| --- | --- |
| 23.976 | 100001000010000100001000010000 |
| 24.0 | 100001000010000100001000010000 |
| 25.0 | 100000100000100000100000100001 |
| 30.0 | 000000000000000000000000000000 |

By discarding the duplicate frames, the original source frame sequence can be recovered. It must however be anticipated that other unexpected duplicates will occur due to:

Capture jitter due to non-real-time O/S task scheduling;
player jitter in presenting video frames;
imperfect duplicate detection where frames are erroneously marked as a duplicate; and
a static desktop where consecutive frames are truly identical.

It is therefore desirable to ensure that only frames duplicated at the beat frequency due to repeated capture of the same source frame are deleted.

Figure 4:
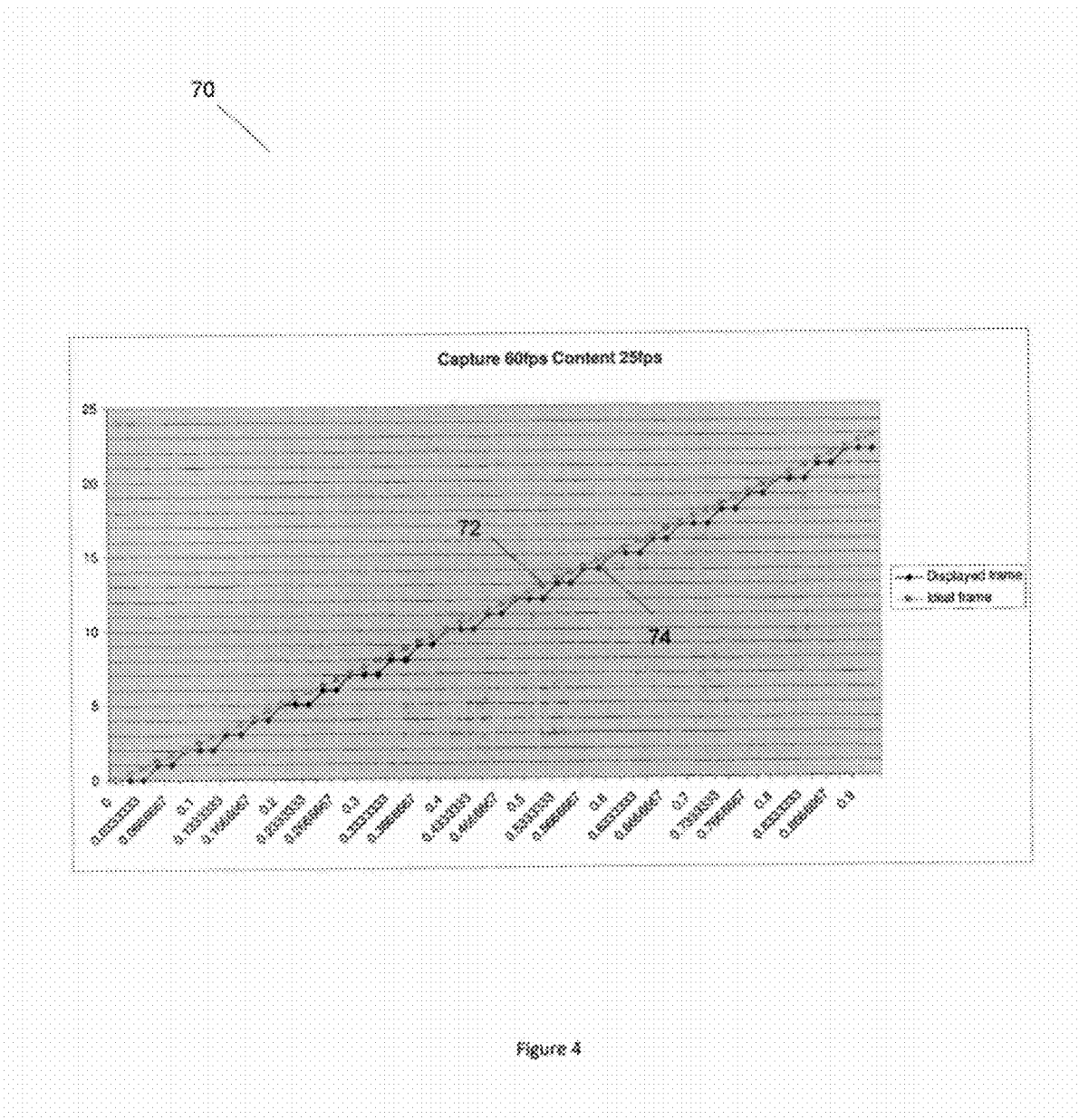
FIG. 4 shows reduced judder with a capture frame rate much higher than the content frame rate.

The source frame rate may be ambiguous under certain circumstances, for example when:

Multiple windows are displaying content at different frame rates;
a static image is displayed on the PC; and
there is high capture jitter caused by O/S scheduling FIG. 4 show how the video subsystem on a PC achieves smooth playback. The player's video output (plot line 72) is sampled at a much higher frame rate (plot line 74) than the content frame rate, typically 60 Hz. This reduces the worst case error from the ideal presentation time to 1/60 seconds. By sampling at the higher frame rate this scheme comes close to meeting the ideal presentation time. Because the capture rate is sufficiently high, this scheme provides smooth video for all normal content frame rates. However, as described above, capturing at a higher rate is not achievable on many computers due to system limitations. The capture rate may thus need to be limited, to 30 frames per second for example.

Image Checksumming

Figure 6:
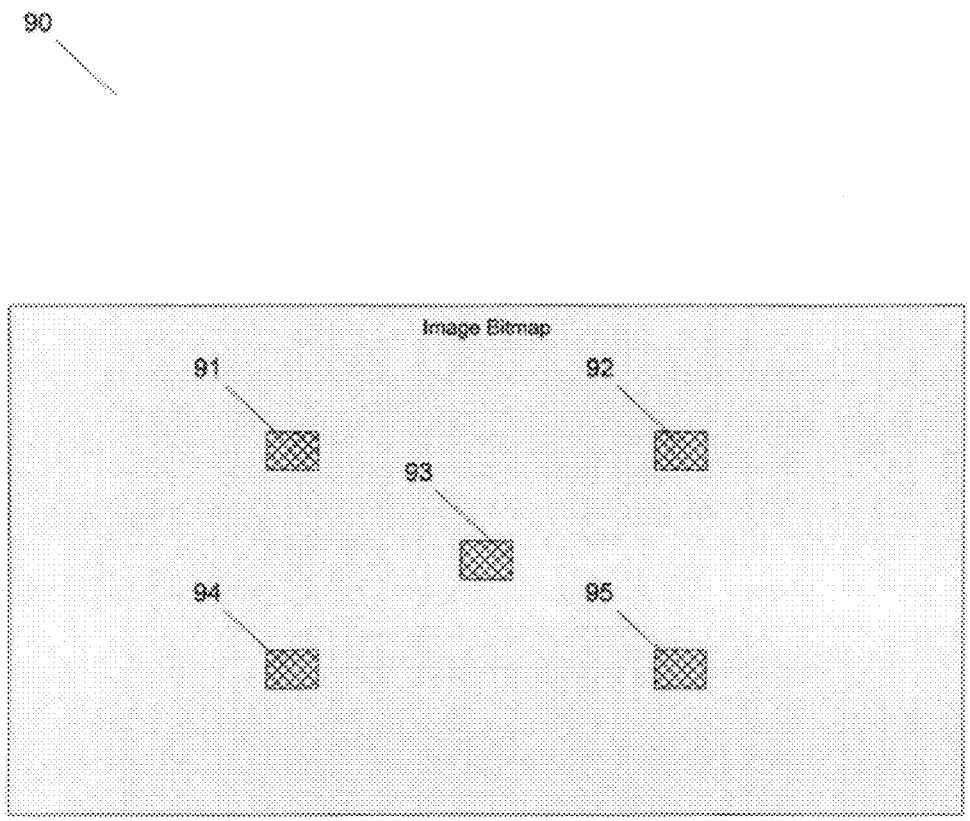
FIG. 6 shows an example of an image checksummer.

The Image Checksummer performs a checksum over a number of rectangular areas (91, 92, 93, 94, 95), or regions, of the video image bitmap as shown in FIG. 6.

Performing a checksum over all bytes in the captured image bitmap can be CPU intensive. To minimise CPU load, the checksum may be performed over restricted portions of the image bitmap. However this may lead to an increased probability of false positive duplicate detection. The size and number of the rectangular areas (91, 92, 93, 94, 95) is therefore a trade-off between CPU load and duplicate detection reliability. The rectangular areas therefore are positioned in sections of the image where change is most likely.

Duplicate Detection

The Duplicate Detector of FIG. 2 marks a frame as a duplicate when its checksum is equal to the checksum of the previous frame in the video stream.

Duplicate detect may not be perfect for the reasons described above, resulting in false positives (frames incorrectly marked as duplicate). The checksumming is combined with a prediction process—beat correlation, to reduce the effect of false positives.

Beat Correlation

The Beat Correlator in FIG. 2 is responsible for identifying which frames should be discarded and what timing correction should be applied to the remaining frames. To achieve this, it needs to:

Identify the beat period (the dominant period) of duplicate frames. (The beat period=1/beat frequency.)
Track the current position in the beat cycle to allow for:
Discard of duplicates occurring at the beat frequency
Timing correction for the remaining frames A beat cycle is a series of capture frame between two successive duplicated frame occuring at the beat frequency. For example, considering Table 2 with a source frame rate of 24.0 fps, four complete beat cycles are shown (c1 to c4) from the first duplicate to the fifth duplicate.

TABLE 2

| Beat cycle | |
| --- | --- |
| Source Frame Rate | Duplicate Series |
| 24.0 | 10000100001000010000<br>  |  c1  |  c2  |  c3  |  c4  | |

Figure 7:
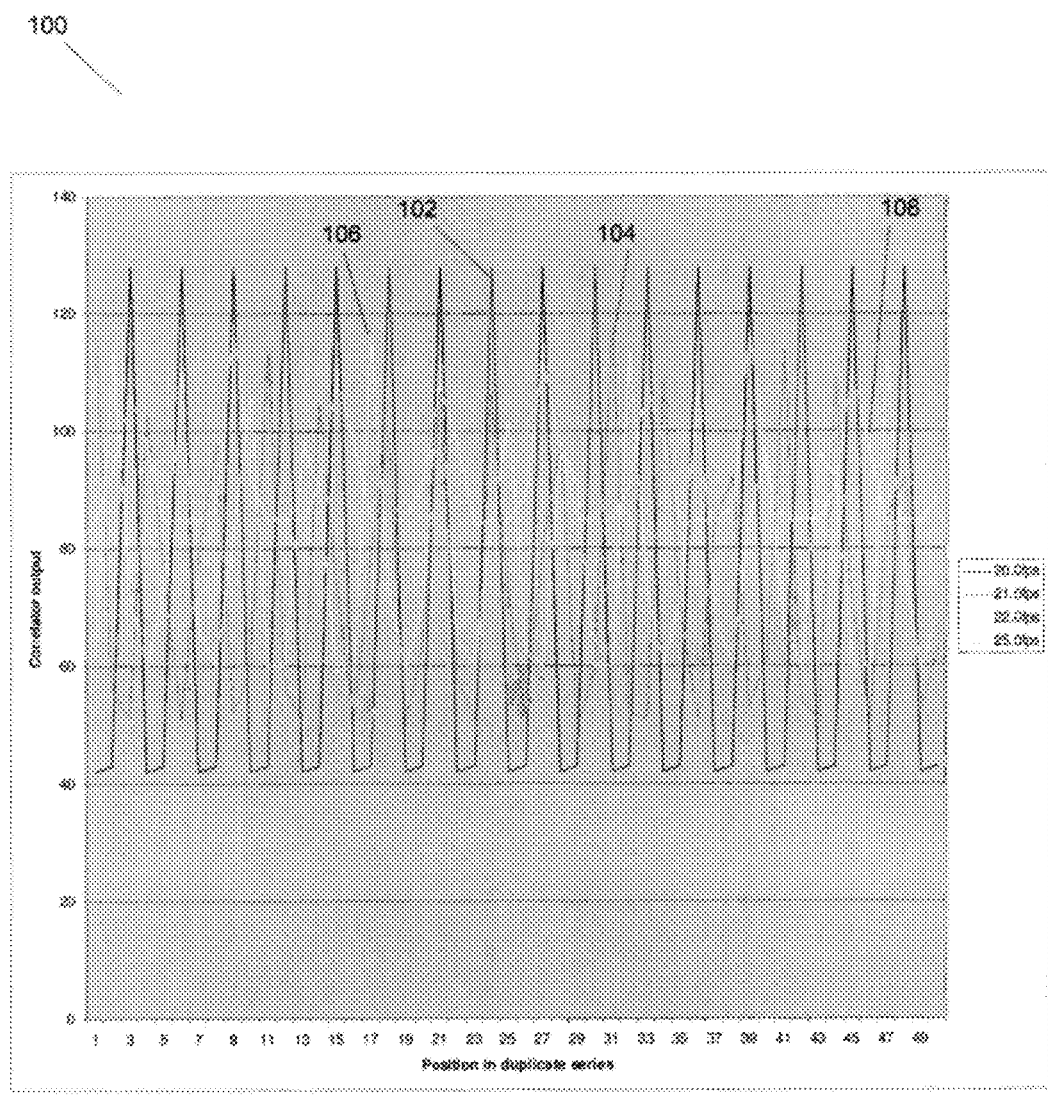
FIG. 7 shows the beat correlator output for different source frame rates.

To reduce the effect of false duplicates in the series of tagged duplicate frames, an auto-correlation is performed on the incoming duplicate series to identify any strong periodicity to detect the dominant period (beat period) in the tagged duplicate frames. FIG. 7 illustrates the correlator output for different source frame rates and shows peaks identifying the periodicity in the frames marked duplicate within the capture frame series. Plot 108 for example shows the beat detection for a source frame rate of 25 fps, with peaks occurring every 6 frames.

Figure 8:
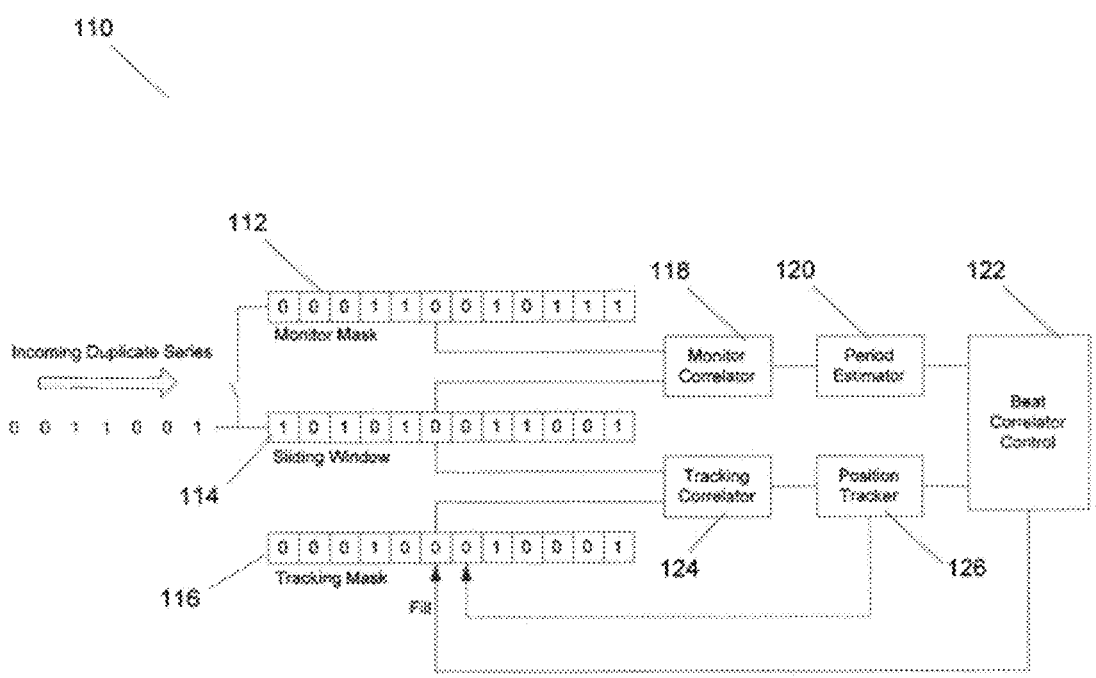
FIG. 8 shows an embodiment of the beat correlator.

FIG. 8 shows how beat correlation, including the auto-correlation is performed by the beat correlator. The auto-correlation is performed by loading correlator register 112 with a portion of the incoming duplicate series. This correlator register 112 is referred to as the monitor mask. The incoming duplicate series is then shifted into a second correlator register 114, referred to as the sliding window. Once the sliding window is full, the monitor mask is compared against the sliding window and the number of like bits is counted by the monitor correlator 118. The comparison and count is repeated each time a new value is shifted into the sliding window. The count of like bits forms the auto-correlator output. The period estimator 120 determines the period between strong peaks in the correlator output occuring at the beat period.

Having measured the beat period using auto-correlation, a third correlator register 116 is filled with a series corresponding to the measured period. The third register is referred to as the tracking mask. Unlike the monitor mask 112, the tracking mask 116 contains:
A perfect series with no errors (i.e. duplicate entries are only present at the beat frequency)
A series with a known phase relative to register bit zero
A cross correlation is performed between the current contents of the sliding window 114 and the tracking mask 116. The position of peaks in the correlator output allows the current position in the beat cycle to be determined.

The Beat Correlator provides the following outputs for the purpose of correcting timestamps to match the source frame rate:
Boolean indicating if a duplicate is expected
The current position in the beat cycle [0-n]
The cycle length in units of capture periods [n].
The cycle length in units of source frame periods.

Time Stamp Correction
The Time-Stamp Corrector 42 in FIG. 2 uses the output values provided by the Beat Correlator 40 to correct the presentation time-stamps for non-discarded frames to match the source frame rate.

If no source frame rate is determined from the beat correlation process (for example, due to multiple video streams simultaneously running on the PC display at different frame rates) then no frames are discarded and the presentation time-stamps are left unadjusted at the capture rate.

Figure 5:
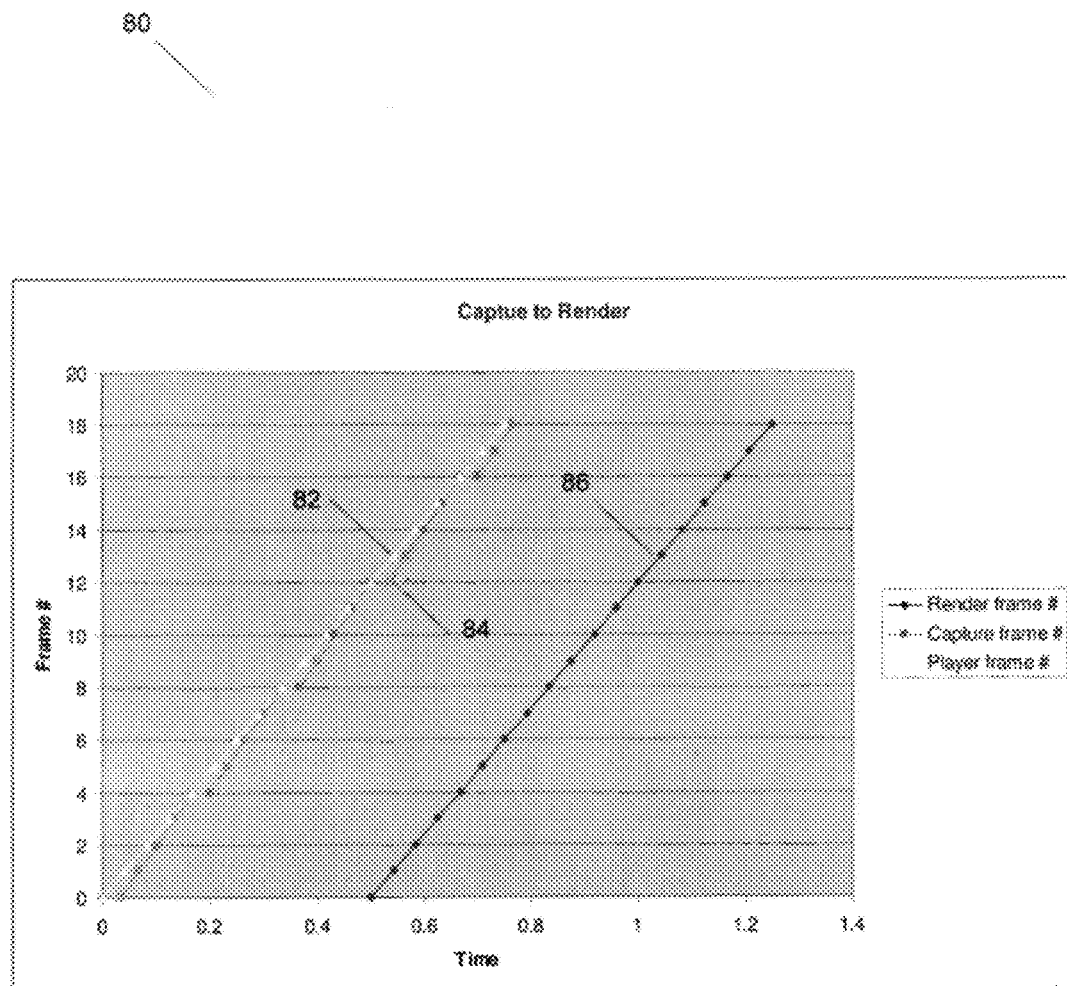
FIG. 5 compares source render times, capture times and presentation times for video frames.

FIG. 5 shows a graph 80 of the rendered frames, once duplicates occurring at the beat frequency have been removed and the frames transmitted to the renderer 22. Plot 82 shows the source player render time on the PC and plot 84 shows the capture time, showing that periodically the source frame is capture twice. Plot 86 shows the final render on the set top box/renderer 22 with the duplicates removed, thereby maintaining the same frame rate as the original source content. A resulting delay is incurred by the capture, processing and transmission to the renderer. For example, in FIG. 5, an example delay of 0.5 s is show between the PC render time and the set top box/renderer 22 render time.

No doubt many other effective alternatives will occur to the skilled person. For example, the skilled person will recognise that the techniques we describe are applicable to a range of computing devices including, but not limited to: desktops, laptops, tablet computers, smartphones and the like. It will he understood that the invention is not limited to the described embodiments and encompasses modifications apparent to those skilled in the art lying within the spirit and scope of the claims appended hereto.

What is claimed is:

1. A method of transmitting a video stream over a data link, the video stream comprising a series of video frames having a source frame rate, the method comprising:
capturing said series of video frames at a capture frame rate; processing said captured series of video frames to provide a filtered series of video frames, wherein said processing comprises:
identifying duplicated frames in consecutive frames of said captured series of video frames, deleting said duplicated frames from said captured series of video frames, and retiming said filtered series of video frames to amend a presentation time for one or more of said filtered series of video frames;
determining a beat frequency, wherein said beat frequency defines a fundamental frequency of said duplicated frames in said captured series of video frames; wherein said deleting is responsive to said detecting said identified duplicated frames at said beat frequency; and responsive to said detecting said identified duplicated frames at said beat frequency deleting said identified duplicated frames;
determining a beat cycle position of each of said identified duplicated frames, wherein said beat cycle position defines a frame offset of each of said identified duplicated frames relative to a reference position within a same said beat cycle as each of said identified duplicated frames,
wherein said beat cycle defines a series of capture frames between two successive identified duplicated frames occurring at said beat frequency, wherein said reference position is determined by a timing of a correlation peak of a correlation between a tracking mask having a bit pattern dependent on a said beat frequency and matching data within said series of video frames; and responsive to said beat cycle position deleting said identified duplicated frames; and transmitting said retimed filtered series of video frames over said data link.

2. A method as claimed in claim 1, wherein said processing comprises generating matching data defining whether each of said captured series of video frames is one of said duplicated frames; and wherein said determining said beat frequency comprises autocorrelating said matching data to determine said fundamental frequency of said identified duplicated frames in said matching data.

3. A method as claimed in claim 1, wherein said reference position defines one of said successive identified duplicated frames occurring at said beat frequency.

4. A method as claimed in claim 1, wherein said determining said beat cycle position of each of said identified duplicated frames comprises cross correlating said matching data with data at said beat frequency.

5. A method as claimed in claim 1, wherein each of said captured series of video frames comprises a presentation timestamp defining a presentation time for each of said video frames, and said retiming comprises modifying said presentation timestamps of one or more of said filtered series of video frames to amend said presentation time of said one or more of said filtered series of video frames.

6. A method as claimed in claim 5, wherein said source rate is determined from a frame count difference between said capture frame rate and said beat frequency, and wherein said retiming comprises modifying said presentation timestamps such that said filtered series of video frames has a frame rate substantially equivalent to said source frame rate.

7. A method as claimed in claim 1, wherein said identifying duplicated frames in consecutive frames comprises comparing corresponding portions of consecutive frames in said series of video frames to determine if said corresponding portions match one another.

8. A method as claimed in claim 7, wherein said portions each comprise a plurality of dispersed regions of said consecutive frames and said identifying comprises comparing each of said one or more corresponding separate regions to determine if said portions match one another.

9. A method as claimed in claim 7, wherein said portions are arranged dependent on a probability of change between said consecutive frames.

10. A method as claimed in claim 7, wherein said video frames comprise bitmap data, and wherein said identifying comprises calculating a checksum of said bitmap data to determine if said portions match one another.

11. A method as claimed in claim 1, wherein said capturing comprises copying said series of video frames from video data memory.

12. A method as claimed in claim 11, wherein said video data memory is configured to refresh at a video refresh rate, and wherein said capturing comprises synchronising said capture frame rate to said video refresh rate.

13. A method as claimed in claim 12, wherein said capture frame rate is an integer division of said video refresh rate.

14. A method as claimed claim 13, wherein said capture frame rate is a half or a third or a quarter of said video refresh rate.

15. A method as claimed in claim 1, wherein said capture frame rate is greater than said source frame rate.

16. A method as claimed in claim 1, wherein said data link comprises an IP data link.

17. A method as claimed in claim 1, wherein the data link comprises a wireless data link.

18. A method as claimed in claim 17, wherein said wireless data link comprises a wireless USB data link.

19. A method as claimed in claim 18, where the video stream is transmitted from a computer to a television display over said wireless USB data link.

20. A non-transitory carrier carrying processing code for implementing the method of claim 1 on a computer.

\* \* \* \* \*